United States Patent [19]

Poosala et al.

[11] Patent Number: 6,108,647
[45] Date of Patent: Aug. 22, 2000

[54] METHOD, APPARATUS AND PROGRAMMED MEDIUM FOR APPROXIMATING THE DATA CUBE AND OBTAINING APPROXIMATE ANSWERS TO QUERIES IN RELATIONAL DATABASES

[75] Inventors: Viswanath Poosala, Highland Park, N.J.; Venkatesh Ganti, Madison, Wis.

[73] Assignee: Lucent Technologies, Inc., Murray Hill, N.J.

[21] Appl. No.: 09/082,057

[22] Filed: May 21, 1998

[51] Int. Cl.[7] .................................................. G06F 17/30
[52] U.S. Cl. ...................... 707/1; 707/2; 707/6; 709/201; 702/180; 705/400
[58] Field of Search ....................... 707/1, 2, 6; 709/201; 702/180; 705/400

[56] References Cited

U.S. PATENT DOCUMENTS

| | | | |
|---|---|---|---|
| 5,765,146 | 6/1998 | Wolf et al. ................................... | 707/2 |
| 5,995,957 | 11/1999 | Beavin et al. .............................. | 707/2 |
| 5,999,928 | 12/1999 | Yan ............................................. | 707/6 |

OTHER PUBLICATIONS

Viswanath Poosala and Yannis Ioannidis, "Selectivity Estimation Without The Attribute Value Independence Assumption", Proc. of the 23rd Int. Conf. on Very Large Databases, Aug. 1997.

Joseph M. Hellerstein et al., "Online Aggregation", Proc. of ACM SIGMOD conf., Aug. 1997.

Joseph M. Hellerstein et al., Online aggregation. Proc. of ACM SIGMOD conf, 1996.

Viswanath Poosala and Yannis Ioannidis. Estimation of query–result distribution and its applicabion in parallel–join load balancing. Proc. of the 22nd Int. Conf. on Very Large Databases, Sep. 1996.

P.G. Selinger, M.M. Astrahan, D.D. Chamberlin, R.A. Lorie, and T.T. Price. Acess path selection in a relational database management system. Proc. of ACM SIGMOD Conf, pp. 23–34, Jun. 1979.

*Primary Examiner*—John E. Breene
*Assistant Examiner*—Cheryl Lewis
*Attorney, Agent, or Firm*—Dickstein Shapiro Morin & Oshinsky LLP

[57] ABSTRACT

A novel and unique method of approximating the data cube and summarizing database data in order to provide quick and approximate answers to aggregate queries by precomputing a summary of the data cube using histograms and answering queries using the substantially smaller summary. A unique method according to the present invention provides for identifying accurate histogram classes and distributing the space among the histograms on various sub-cubes such that the errors are minimized, while at the same time computer resources are maximized.

30 Claims, 4 Drawing Sheets

METHOD, APPARATUS AND PROGRAMMED MEDIUM FOR APPROXIMATING THE DATA CUBE AND OBTAINING APPROXIMATE ANSWERS TO QUERIES IN RELATIONAL DATABASES

BACKGROUND OF THE INVENTION

1. Field of the Invention

The present invention relates to relational databases and more specifically, to obtaining approximate answers to aggregate queries in relational databases.

2. Discussion of Related Art

Databases are traditionally defined as repositories of facts about some aspect of the real world and a database management system (DBMS) is primarily required to simply provide an environment that is both convenient and efficient to use in retrieving and storing database information. It is implied that the DBMS should provide accurate answers to queries on the data, i.e., answers that are consistent with the real world. In fact, accurate answers are essential in nearly all common applications of databases.

Although obtaining accurate answers to queries on the data is almost a prerequisite in a traditional setting, there is an increasing necessity for a DBMS to provide approximate answers to queries, i.e., answers that are only "nearly" consistent with the real world. The main motivation for approximate answers comes from two very different kinds of applications: decision support applications and real-time applications. Decision support applications, also known as on-line analytical processing (OLAP) applications, analyze the data in a data warehouse (often related to a business enterprise) to glean important trend information. This typically involves complex aggregate queries operating on large amounts of data thereby incurring large processing times. These delays are intolerable when users need to analyze the data interactively. Similarly, some real-time applications, such as telecom switches, need to make very quick decisions based on the data, which is often impossible if the entire data needs to be analyzed. Fortunately, many of these applications can readily tolerate "small" errors in query results in exchange for significantly lower response times, as illustrated below.

One example of "small" error tolerance may be given in the context of market analysis performed by a large multinational corporation to analyze sales data over the past several years to find a nation with a potential market for the company's products. In such an application, the first step in the analysis is to compute an aggregate, such as the total dollar value of sales in order to rank the continents, and there is likely little interest in answers accurate to the last cent. Once an interesting continent is selected, a much more detailed analysis is performed on the nations within that continent, this time requiring an exact answer in order to prepare a report.

A second example may be given in the telecommunications area, where telecommunication switches are used to route calls based on current traffic load on various available channels. Obviously, speed is of the essence in this situation. Since the traffic data can be very large, the switches typically query a dynamically maintained summary of the current load. Due to the approximate nature of the data, the switch may sometimes select a sub-optimal route, but this is not a critical hazard to the switch's operation, as long as it is not too frequent.

These examples point out two different ways an approximate answer can be used (applicable to both kinds of applications): for pruning the queried data and as the ultimate answer. In either case, the response time is likely to be drastically reduced. The new requirement of a DBMS therefore is to provide approximate answers quickly but with reasonable accuracy. Fortunately, database research and most DBMSs already contain the necessary preliminary tools to solve this problem in the form of statistics.

Statistics, such as samples and histograms, are used extensively by many DBMSs to perform critical estimations. For example, query optimizers rely on accurate selectivity estimates in order to identify an optimal execution plan and parallel query execution engines benefit from estimates of query result distributions. In these applications, statistics are used to approximate the frequency distributions of attributes in the database relations, and almost never used for query answering.

Sampling-based statistical techniques for providing a series of increasingly accurate answers culminating in the correct answer to aggregate queries are known. Their main emphasis, however, is on efficient query processing techniques and probabilistic guarantees on the partial results of a given query, and not on using statistics to provide a single approximate answer to OLAP queries very quickly.

There are two reasons that make careful statistics selection critical and rewarding in OLAP. First, the size of the data cube (database relations) is very large and demands on the accuracy of an approximate query answering system are very high, requiring large amounts of space for the histograms. Second, the interplay between histograms on various sub-cubes allows distribution of space among the histograms such that the accuracy requirements are satisfied with minimal resources.

The above problem also arises for almost all kinds of statistics and in many applications. For example, a common challenge faced by the database administrator of a DBMS is identifying the correct set of attributes to build statistics on for accurate selectivity estimates. Unfortunately, most work related to database statistics focuses on identifying a specific instance of statistics to be used for an estimation problem (typically, selectivity estimation), but rarely deals with the collection of statistics on a relation.

Histograms are usually used to approximate the frequency distributions of one or more attributes of a relation by grouping the data into subsets (buckets) and making uniformity assumptions within each subset. A histogram is a bar graph in which the area of each bar is proportional to the frequency or relative frequency presented. The main advantages of histograms are that they incur almost no run-time overhead, they do not require the data to fit a probability distribution or a polynomial and, for most real-world databases, there exist histograms that produce low-error estimates while occupying reasonably small space. Hence, they are the most commonly used form of statistics in practice (e.g., they are used in DB2, Informix, Ingres, Oracle, and Sybase database systems), but are used for approximating mostly single-dimensional frequency distributions in the context of selectivity estimation.

OLAP users find it useful to organize data along several dimensions of a multidimensional data cube and perform aggregate analysis on (possibly subsets of) the dimensions. The cells of the data cube contain the corresponding value of a measured attribute. For a large relation, the data cube is very large (several gigabytes) and answering even simple queries requires significant amounts of time. This problem has been addressed by precomputing parts of the data cube, building indexes, and using efficient techniques for computing the cube and answering queries. All of this, however, deals with providing exact, not approximate, answers to queries.

There is a need, therefore, of an efficient method using statistics to summarize database data in order to provide quick and approximately accurate answers to aggregate queries. Furthermore, because an important issue in the use of statistics is determining a configuration that minimizes estimation error for queries in a database, there is a need for a method of determining a configuration that minimizes estimation errors, while at the same time maximizing the use of computer resources (e.g., space). Many of the known techniques for minimizing error given a set amount of space suffer from significant disadvantages.

An OPTIMAL algorithm for minimizing error given space, for example, operates as follows. The total number of possible histogram configurations that can be generated on N sub-cubes given a certain amount of space $\beta$ is combinatorial in $\beta$,N. This value is very high for most realistic values of $\beta$. The OPTIMAL algorithm identifies each possible allocation, computes its error Es (sum of Es over all sub-cubes), and finds the histogram configuration that minimizes the total error as the best. Although this algorithm is accurate, it requires huge resources, as it is clearly exponential in N.

Another known algorithm uses a standard randomized technique, such as iterative improvement. The optimum value over all starting points in this RANDOM algorithm is then picked as the "optimal" solution.

Moving away from optimality, a third known algorithm is a NAIVE space allocation scheme, which divides the available space, $\beta$, equally among the n histograms, one on each sub-cube, Si. This algorithm takes a constant amount of time but it does not take the interactions between histograms on different attribute combinations into account. A query on Si would be answered by the direct operation on histogram H(Si,$\beta$/n). The resultant configurations obtained through this algorithm, however, are not as good as other configurations because they do not take advantage of the dependencies between sub-cubes.

Both the OPTIMAL and NAIVE solutions are unsatisfactory, the former because it is computationally expensive to build, and the latter because of its unsatisfactory performance as far as accuracy of the configurations it generates is concerned.

There is a need, therefore, for a method to determine a histogram configuration that minimizes estimation errors, while at the same time maximizing the use of computer resources. More explicitly, there is a need to identify accurate histogram classes and distribute the space among the histograms on various sub-cubes such that the errors are minimized. This is particularly critical for large database approximations due to large data volumes and potentially high accuracy requirements.

SUMMARY OF THE INVENTION

The present invention alleviates to a great extent the above shortcomings in the art. The present invention provides a novel and unique method of summarizing database data in order to provide quick and approximate answers to aggregate queries by precomputing a summary of the data cube using histograms and answering queries using the substantially smaller summary. Further, the present invention provides a unique method identifying accurate histogram classes and distributing the space among the histograms on various sub-cubes such that the errors are minimized, while at the same time computer resources are maximized.

These and other advantages and features of the invention will become more clearly apparent from the following detailed description of the invention which is provided in connection with the accompanying drawings.

DETAILED DESCRIPTION OF THE PREFERRED EMBODIMENTS

Figure 1:
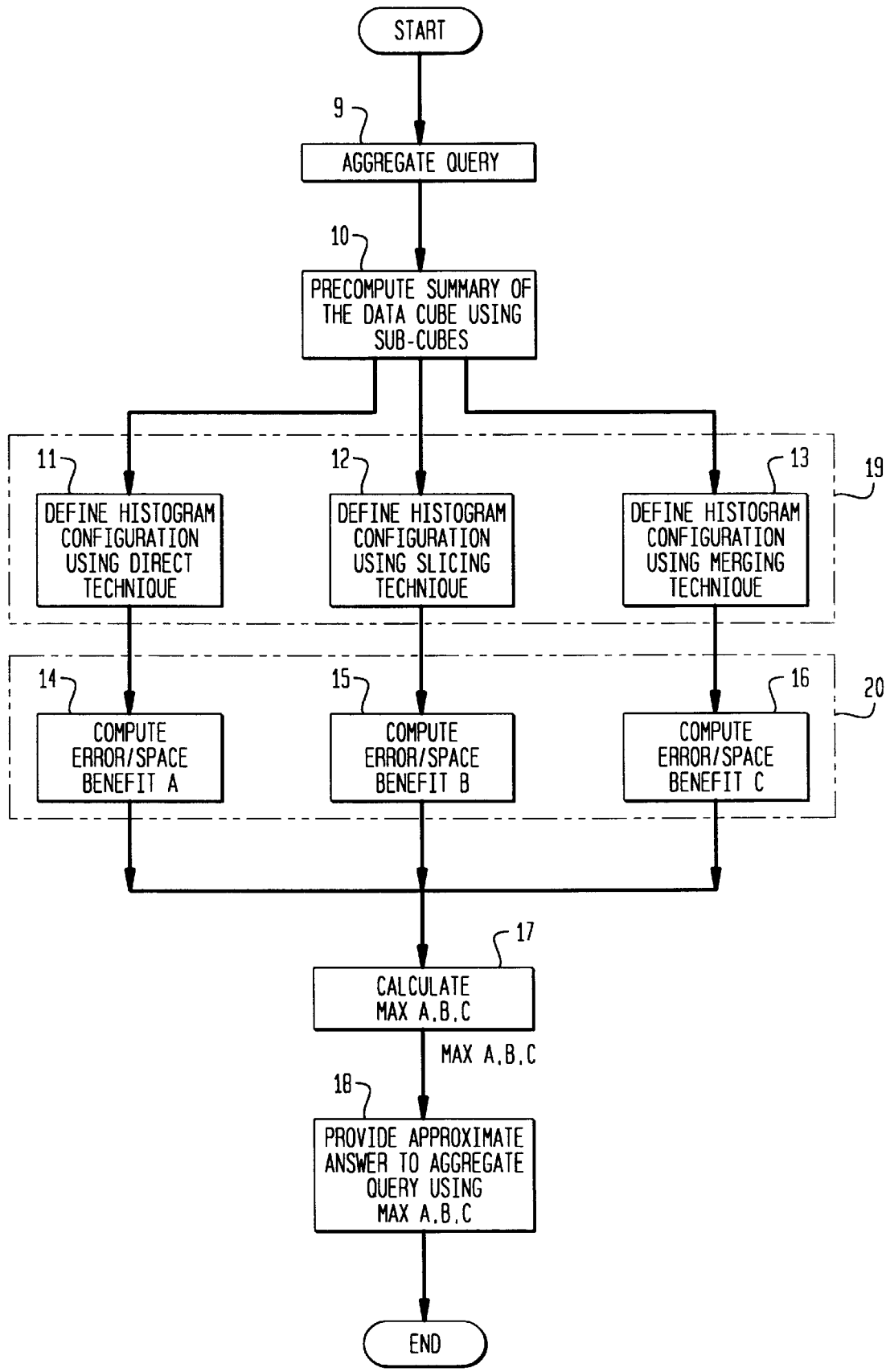
FIG. 1 shows a flow chart of a method of providing approximate answers to aggregate queries according to a preferred embodiment of the present invention.

Preferred embodiments of the present invention are now described in detail in connection with the accompanying drawings. FIG. 1 illustrates a flow chart of a method of providing approximate answers to aggregate queries in a relational database. The method comprises step 9 of posing an aggregate query to a relational database. A description of step 10, precomputing a summary of the data cube (relational database), using sub-cubes follows below.

Precomputing step 10 may be implemented by one of several known multi-dimensional histograms, according to efficient partitioning techniques for building them. Key properties that characterize histograms, including properties that determine the effectiveness of histograms in approximating aggregate distributions are the following: the sort parameter, which specifies the order in which the attribute-value/measure pairs of the data distribution are grouped in the histogram; the histogram class, which specifies the sizes of the data subsets (buckets) allowed in the histogram; the source parameter, which specifies the quantity that the histogram should try to capture accurately; and the partition constraint, which is the mathematical rule that specifies where exactly the histogram boundaries will fall based on the source parameter. Both the sort and the source parameters are functions of the attribute-value/measure pairs in the data distribution. Examples include the attribute value itself (V), the measure itself (M), the area (A), and the spread (S). The partition constraints include the following:

Equi-sum: In an equi-sum histogram with $\beta$ buckets, the sum of the source values in each bucket is approximately the same and equal to 1/$\beta$ times the sum of all the source values in the histogram.

V-Optimal: In a V-Optimal histogram, the weighted sum of the variances of the source parameters values in each bucket is minimized, where the weights are equal to the number of values in the corresponding buckets.

MaxDiff. In a MaxDiff histogram, there is a bucket boundary between two source parameter values that are adjacent (in sort parameter order) if the difference between these values is one of the $\beta$−1 largest such differences.

By making different choices for each of these orthogonal characteristics, different classes of histograms may be obtained. Thus, p(s,u) denotes a histogram class with partition constraint p, sort parameter s, and source parameter u.

The present invention uses an MHIST algorithm for multi-dimensional histograms, although it should be obvious to one of ordinary skill in the art that any other multi-dimensional histogram algorithm that accomplishes the same or similar functions may be used in lieu of MHIST. Briefly, MHIST repeatedly partitions the most "critical" dimension at each step (chosen based on the partition constraint from the current set of distributions), until the number of partitions equals the number of buckets needed. For example, to build a MaxDiff(V,F) histogram, this algorithm selects the dimension whose marginal distribution contains the maximum difference between any two neighbors and splits that dimension between those values.

Figure 3:
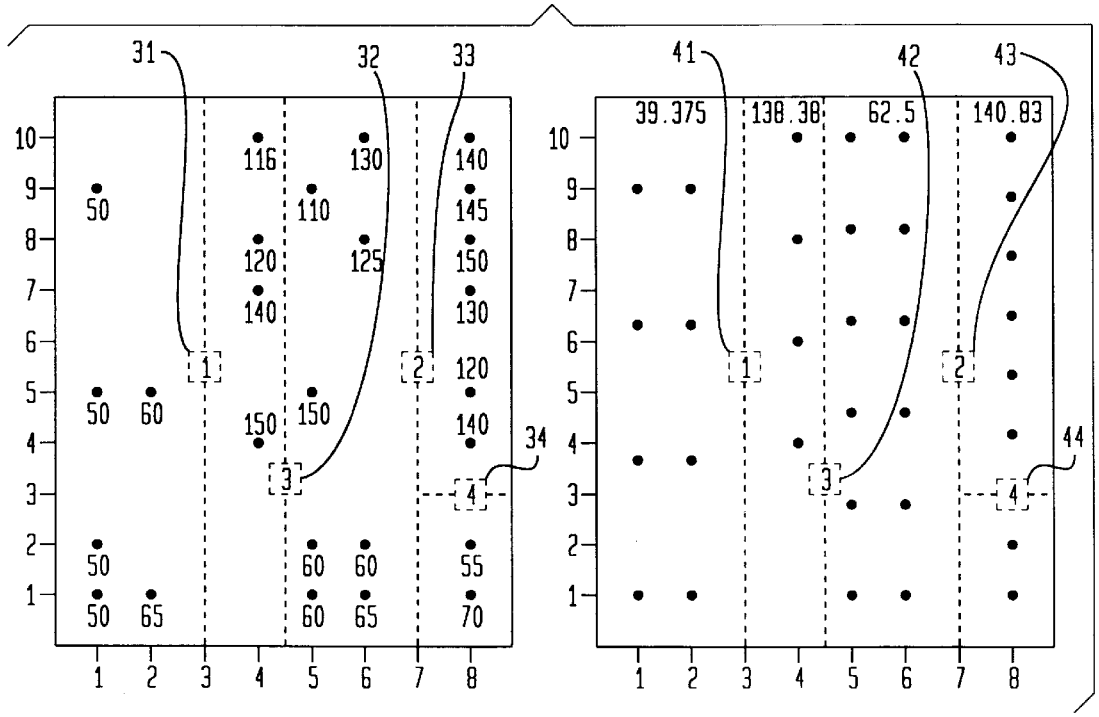
FIG. 3 shows the actual and approximate distribution of a data cube into data subsets (buckets)

FIG. 3 illustrates the MaxDiff(VM) partitioning of space into five data subsets (buckets). Dashed lines 31, 32, 33, and 34 denote the order in which the splitting took place during actual distribution, while dashed lines 41, 42, 43, and 44 denote the partitioning of data during approximate distribution.

Returning to the method of providing approximate answers to aggregate queries in a relational database illustrated in FIG. 1, a further step 19 in the method is the step of summarizing the different sub-cubes using histograms. Histograms are known to have been successfully used in approximating frequency distributions. Most aggregate measure distributions share the key properties with frequency distributions, namely, multi-dimensionality, skew in the measure (frequency) and value distributions, and dependence between attributes (defined shortly). It follows, therefore, that histograms may be used for approximating aggregate measure distributions as well. The exact methodology, described below, is novel and more space-efficient than the traditional usage of histograms.

Significant to the choice of methodology is that any query on a data-cube can be answered approximately by posing that query on a summary of its aggregate distribution. For concreteness, a specific class of query operations should be considered as an example. A common operation in OLAP queries involves applying an aggregate operator over a selected region of data in a subset of dimensions, say, S. The result of this operation can be estimated from a summary of the aggregate distribution of S.

At step 19, various methods 11, 12, 13 of defining the histogram configuration for summarizing the aggregate distribution are used. A naive solution for answering queries on any sub-cube is to build histograms on all possible sub-cubes, which may require large amounts of space—there are $2^n-1$ sub-cubes on a data cube of dimension n. Fortunately, the following histogram transformations present other alternatives.

The Direct estimation technique 11, for example, estimates a summary of the aggregate distribution of S by using a histogram on S. Alternatively, Slicing estimation technique 12 estimates the aggregate distribution of S by protecting the summarized distribution of a superset of S, similar to obtaining the sub-cubes from the cube, as illustrated below. The slicing operation enables answers to queries on many sub-cubes using a single histogram and hence reduces the number of histograms to be built. Nevertheless, for the same space, the accuracy of a "slice-estimate" is likely to be less than the accuracy of a "direct-estimate" because of the following reasons: (a) the sliced histogram is built on higher dimensional data which is in general more complex to approximate and (b) it may not be as accurate on each subset of attributes as the most accurate histograms built directly on those data subsets (buckets).

Finally, Merging estimation technique 13 estimates a summary of the aggregate distribution of S from histograms on its component attributes by assuming that these attributes are independent. A formal definition of attribute independence is given below.

A set of attributes Xi, 1<i<n have mutually independent aggregate distributions if $$\forall 1 \leq i,j \leq n, \forall 1 \leq k,m \leq Di, \forall 1 \leq l,n \leq Dj,$$

$$m(\ldots,k,\ldots,1\ldots)/m(\ldots,k,\ldots,n,\ldots)=m(\ldots,m,\ldots,1\ldots)/m(\ldots,m,\ldots,n1\ldots)$$

where k and m appear in the ith argument of f and l and n appear in the jth argument of f. If T is the sum of measures in the data cube, the above definition implies the following derivation of an aggregate distribution from individual distributions:

$$m_{1,\ldots,n}=1/T^{n-1} x m_1 x \ldots m_n.$$

Note that when the attributes are not independent, this assumption results in wrong estimates of the aggregate distribution. For example, it is natural for the salary attribute of an Employee relation to be 'strongly' dependent on the age attribute (i.e., higher/lower salaries mostly going to older/younger people). On the other hand, under this assumption, one can simply build one-dimenensional histograrians, which are implemented in most commercial systems, and use them for all estimates.

In sum, step 19 comprises defining a histogram configuration of a data cube as any set of histograms built on its sub-cubes that allows estimation on all the sub-cubes using the direct, slicing, merging and/or any other comparable technique for estimating the aggregate distribution of S.

It is appropriate to mention that the histogram built on all dimensions of sub-cube D, denoted by H(D), is characterized by its class from the taxonomy and the space allocated to it. Examples of valid configurations on a data cube {S,C,P} are {H(SCP)},{H(S), H(C), H(P)}, {H(SC), H(S), H(P)}. On the other hand, {H(P), H(SP)} does not constitute a configuration because it can not be used to summarize C.

Figure 2:
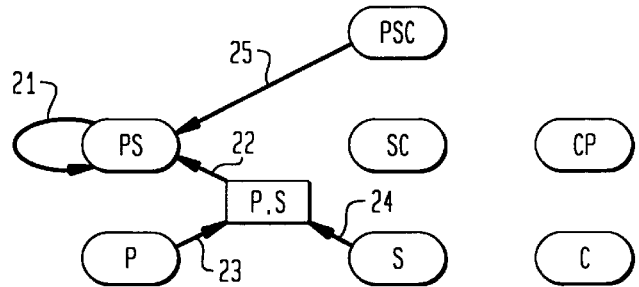
FIG. 2 illustrates three different methods of defining a histogram configuration in a database.

FIG. 2 graphically illustrates the different ways of summarizing the distribution on PS. Line 25 from node PSC to node PS represents the slicing operation. Line 21 from node PS to node PS represents the direct operation. The merging operation is represented by line 22 from the merged node P, S (via lines 23, 24) to node PS. As FIG. 2 makes clear, queries on a sub-cube can therefore be answered using summarizations resulting from several sets of histograms.

The next step in the method of providing approximate answers to aggregate queries in a relational database shown in FIG. 1, step 20, illustrates the proposition that to achieve highest accuracy on a given set of queries over a sub-cube, the summarization that minimizes the average error over these queries should be used. Step 20 comprises calculation of the average error given a set computer resource, i.e., space.

The least average error on sub-cube $Si(1<i<N)$ by $e_i^*$ is the sum of average errors in answering queries on various sub-cubes, i.e., $$Es=\Sigma e_j^*$$

Due to the nature of various histogram transformations, the errors of two different configurations can be widely different, even for the same amount of space. In view of the limited resources and high accuracy requirements, it is important to select configurations that minimize resource consumption (space-optimal) and/or offer the highest accuracies (error-optimal) on all the sub-cubes.

At step 20 of the method shown in FIG. 1, the error/space computations are made according to a novel GREEDY algorithm. This algorithm produces a solution close to OPTIMAL in terms of quality, and involves, as an initial step, the addition of x buckets to a histogram on a sub-cube.

Since the histogram class is fixed for all sub-cubes, a histogram configuration can be represented by an n-tuple M=<x1, . . . ,xn> where xi is the amount of space allocated to a histogram, H($s_i$), on the sub-cube $s_i$. The error associated with the configuration M will be denoted by E(M). The benefit of allocating an additional x buckets of space to H(si) in M to generate a new configuration M', denoted as B($s_i$, x, M), is the reduction of error in answering queries on the data cube. Thus, B($s_i$, x, M)=E(M')−E(M).

The benefit of a configuration and its error are related to each other. Thus, using the highly inexpensive and probably least accurate configuration of making the uniformity assumption on each distribution, if the error is EU=$\Sigma^n_{i-1}$ fii(0) (for simplicity, assume that the uniformity assumption does not require any space), then, $$B+Es=EU$$

Hence maximizing benefit B is equivalent to minimizing the error, Es, of the configuration.

Figure 4:
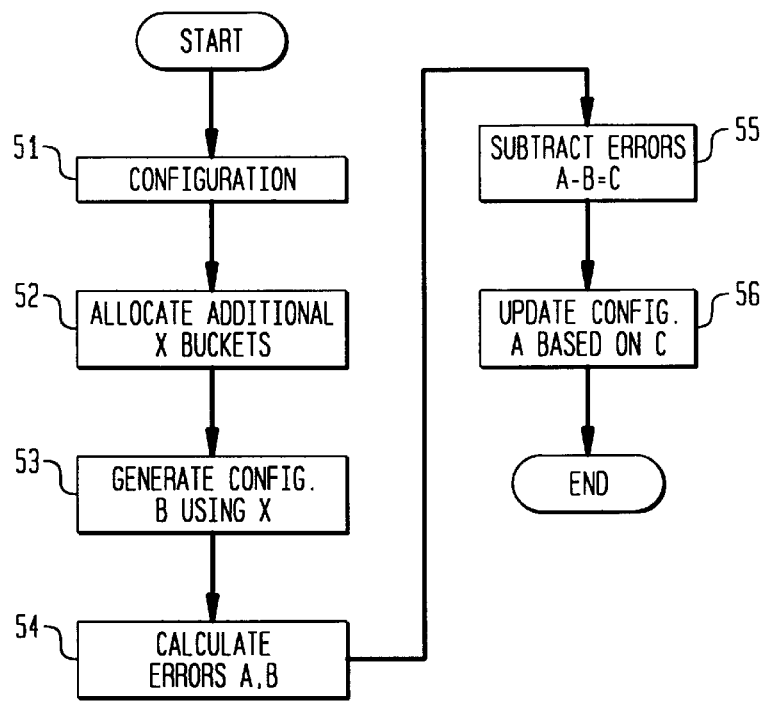
FIG. 4 shows an algorithm for calculation of the benefit.

The COMPUTATION OF BENEFIT algorithm is shown in FIG. 4. Step 51 involves generating a first configuration, CONFIGURATION A, of a data sub-cube in a relational database using one of several known multi-dimensional histograms. At step 52, and additional predetermined number of x buckets are allocated to CONFIGURATION A. Step 53 involves calculating a second configuration, CONFIGURATION B for the sub-cube, using x. Then, the errors for both configurations are calculated at step 54. Step 55 involves subtracting the calculated error values and step 56 involves updating CONFIGURATION A based on the subtracted calculated error value, thereby increasing the benefit for CONFIGURATION A.

Figure 5:
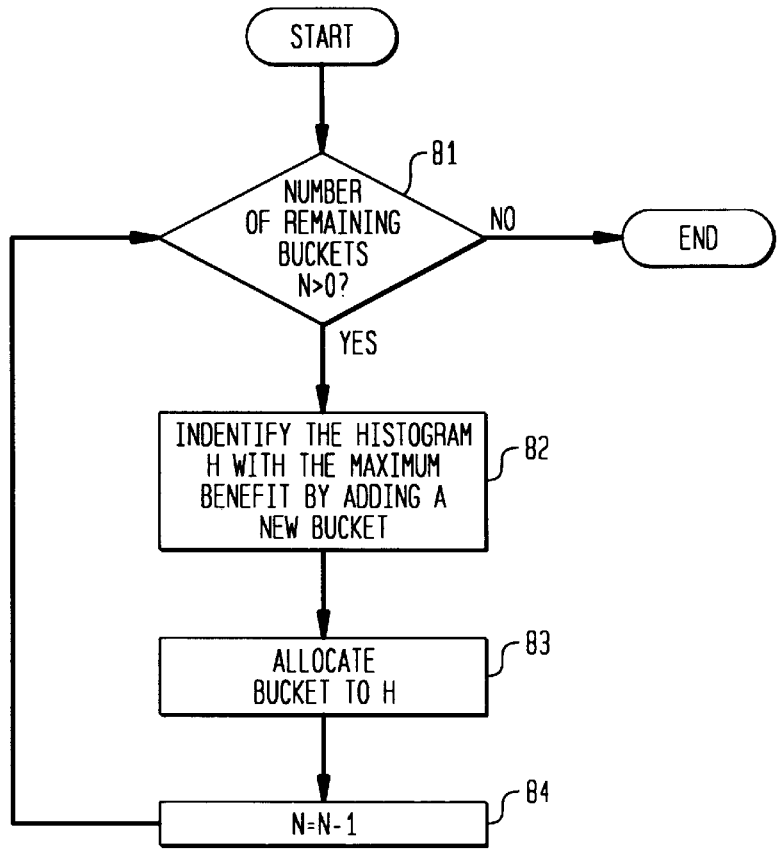
FIG. 5 shows the GREEDY algorithm for bucket allocation among histograms.

The GREEDY Algorithm for bucket Allocation Among Histograms shown in FIG. 5 is described as follows. At step 81, a check of the remaining buckets is performed, at which point it is determined whether the remaining N number of buckets is larger than, or equal to, zero. If N is larger than zero, the histogram H with the maximum benefit is then identified at step 82. A new bucket is allocated to histogram H at step 83. At step 84, the number of remaining buckets N is decreased by one. After step 84, a check of the remaining buckets 81 is again performed. If the number of remaining buckets equals zero, the GREEDY algorithm ends and the optimal allocation of buckets among histograms has been an achieved.

In a data cube with N sub-cubes, if the configuration of histograms is given by H(vi, Mi), i=1, . . . , N and there are β buckets to be assigned, GREEDY operates, as illustrated below, in the following manner:

M=<0, . . . , 0>
for i=1 to β do
assign bucket i to the histogram on
sub-cube vj which maximizes B(vj,x,M), j=1, . . . ,n;
i++;
Update M;
end.

The GREEDY algorithm is linear in the amount of space allocated and in the number of sub-cubes. Hence it is much more efficient than the OPTIMAL algorithm. It also takes the interactions between histograms on several sub-cubes into account.

To answer the question about the quality of the GREEDY solution, the interactions between histograms need to be formalized. Let A(vi) denote the attribute set associated with sub-cube vi. Define an error function, fij , A(vj) ⊆ A(vj), to be a function from fij, $I^+ \rightarrow R$, where fij (x) is the average error in answering queries Qj on vj using a x-bucket histogram on sub-cube vi, denoted H(vi, x). Error functions capture the interactions between histograms under the direct and slicing operations. Under the conditions that only direct, slicing operations are allowed, and that error functions satisfy the diminishing returns principle (meaning that the benefit due to allocating the initial buckets is more than that due to the later buckets; this assumption is almost always true for histograms), i.e., fij (x−1)−fij (x)>fij (x)−fij (x+1), ∀x, i,j=1, . . . ,n, the greedy solution is within a factor of (1−1/e) of the optimal solution.

After computation of the error/space benefit using the GREEDY algorithm for each of the Direct, Slicing, and Merging techniques, the method illustrated in FIG. 1 goes on to step 17, calculating the maximum of the three error/space benefits obtained. As pointed out above, the maximum benefit corresponds to the minimum error. Thus, step 18 of the method in FIG. 1 uses the configuration having the maximum benefit of the minimum error to provide an approximate answer to the aggregate query posed at step 9.

Figure 6:
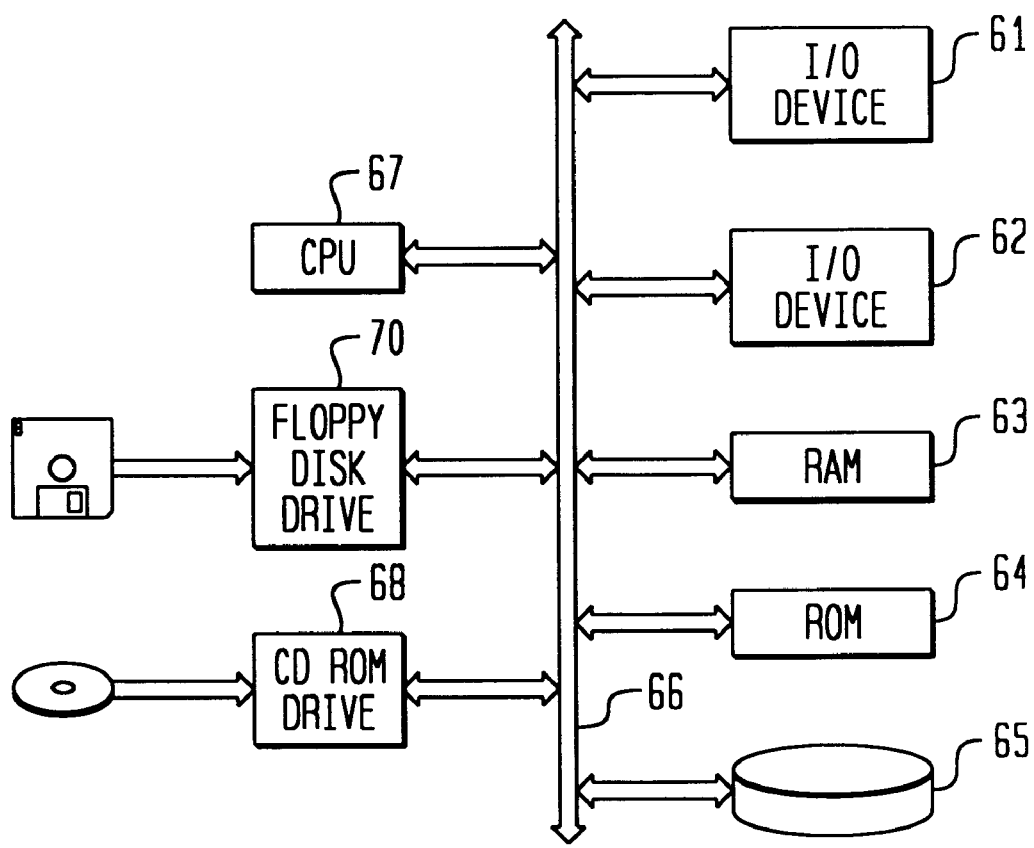
FIG. 6 illustrates a database implementing the instant method of providing approximate answers to aggregate queries in a computer system.

Referring now to FIG. 6, in a preferred embodiment, the method of providing approximate answers to aggregate queries of the present invention is performed on a general purpose computer system 60. The computer system 60 includes a central processing unit (CPU) 71 that communicates with system 60 via an input/output (I/O) device 61 over a bus 66. A second I/O device 62 is illustrated, but is not necessary to practice the method of the present invention. The computer system 60 also includes random access memory (RAM) 63, read only memory (ROM) 64, and may include peripheral devices such as a floppy disk drive 70 and a compact disk (CD) ROM drive 67 which also communicate with the CPU 71 over the bus 66. It must be noted that the exact architecture of the computer system 60 is not important and that any combination of computer compatible devices may be incorporated into the system 60 as long as the method of providing approximate answers to aggregate queries of the present invention can operate on a general purpose computer system 60 having a CPU 71, relational database 65 and RAM 63 as described below.

The processor 71 performs logical and mathematical operations required by the method of the present invention as illustrated in FIG. 1, such as data manipulation and comparisons, as well as other arithmetic and logical functions generally understood by those of ordinary skill in the art. The RAM 63 is used to store the aggregate query 9, the particular histograms used at each step and program instructions required to implement the method of the present invention as illustrated in FIG. 1, and can be comprised of conventional random access memory (RAM), bulk storage memory, or a combination of both, as generally understood by those of ordinary skill in the art. The I/O device 61 is responsible for interfacing with an operator of the computer system 60 or with peripheral data devices (not shown) to receive or output data as generally understood by those of ordinary skill in the art.

Although the preferred implementation is on a programmed general purpose computer, the steps of the illustrated method may be executed in hardware, firmware, or software. The method illustrated in FIG. 1 of the present invention can reside as a computer program on a computer readable storage medium, such as a floppy disk 69 or CD ROM 67, which communicates with the CPU 71 as generally understood by those skilled in the art.

It should be recognized by those of ordinary skill in the art that the novel method of the present invention is also extensible to several other classes of statistics (e.g., sampling), resources (e.g., usage time), and applications (e.g., selectivity estimation).

The present invention has broad applicability in all electronic computer systems employing relational databases and OLAP. The above description is intended to be illustrative, not restrictive. Many modifications which do not depart from the spirit or scope of the invention will be apparent to those skilled in the art upon reviewing the above description. Accordingly, the invention is not limited by the foregoing description, but is only limited by the scope of the appended claims.

What is claimed is new and desired to be secured by Letters Patent of the United States is:

1. A computer implemented method for providing an approximate answer to a query in a stored relational database, the method comprising the steps of:

receiving said query containing input data to said stored relational database;

precomputing a summary of a data cube corresponding to said stored relational database by defining at least one sub-cube;

summarizing said at least one sub-cube using a plurality of histogram techniques;

computing an error/space benefit for each summary of said at least one sub-cube corresponding to each histogram technique;

determining a maximum of the error/space benefits, wherein said maximum error/space benefit corresponds to a summary with a minimum error;

calculating an approximate answer to said query based on said input data using the histogram technique corresponding to said maximum error/space benefit; and outputting said approximate answer.

2. The computer implemented method for providing an approximate answer to a query as in claim 1, wherein said query is an aggregate query.

3. The computer implemented method for providing an approximate answer to a query as in claim 2, wherein said computing step further comprises:

allocating a predetermined number of data subsets to a histogram on said at least one sub-cube having a first data configuration;

generating a second data configuration on said at least one sub-cube using said predetermined number of data subsets;

calculating an error value for each data configuration;

subtracting said error values; and updating said first data configuration based on said subtracted error values.

4. The computer implemented method for providing an approximate answer to a query as in claim 2, wherein said histogram technique is a direct technique.

5. The computer implemented method for providing an approximate answer to a query as in claim 2, wherein said histogram technique is a slicing technique.

6. The computer implemented method for providing an approximate answer to a query as in claim 2, wherein said histogram technique is a merging technique.

7. The computer implemented method for providing an approximate answer to a query as in claim 2, wherein said calculating step further comprises:

counting a number of data subsets corresponding to the histogram technique corresponding to said maximum error/space benefit;

allocating a new data subset to said histogram technique corresponding to said maximum error/space benefit when said number of data subsets is greater than zero;

decreasing said number of data subsets by one; and repeating said counting, allocating and decreasing steps until an optimum allocation of data subsets is achieved when said number of data subsets equals zero.

8. A computer program recorded on a computer-readable medium, said computer program designed to operate a computer to provide an approximate answer to a query in a stored relational database by executing the steps of:

receiving said query containing input data to said stored relational database;

precomputing a summary of a data cube corresponding to said stored relational database by defining at least one sub-cube;

summarizing said at least one of sub-cube using a plurality of histogram techniques;

computing an error/space benefit for each summary of said at least one sub-cube corresponding to each histogram technique;

determining which histogram corresponds to a maximum of the error/space benefits, wherein said maximum of said error/space benefit corresponds to a summary with a minimum error;

calculating an approximate answer to said query based on said input data using the histogram technique corresponding to said maximum error/space benefit; and outputting said approximate answer.

9. The computer program recorded on a computer-readable medium as in claim 8, wherein said query is an aggregate query.

10. The computer program recorded on a computer-readable medium as in claim 9 wherein said computing step further comprises:

allocating a predetermined number of data subsets to a histogram on said at least one sub-cube having a first data configuration;

generating a second data configuration on said at least one sub-cube using said predetermined number of data subsets;

calculating an error value for each data configuration;

subtracting said error values; and updating said first data configuration based on said subtracted error values.

11. The computer program recorded on a computer-readable medium as in claim 9 wherein said histogram technique is a direct technique.

12. The computer program recorded on a computer-readable medium as in claim 9 wherein said histogram technique is a slicing technique.

13. The computer program recorded on a computer-readable medium as in claim 9 wherein said histogram technique is a merging technique.

14. The computer program recorded on a computer-readable medium as in claim 9 wherein said approximate answer is calculated by further executing the steps of:

counting a number of data subsets corresponding to the histogram technique corresponding to said maximum error/space benefit;

allocating a new data subset to said histogram technique corresponding to said maximum error/space benefit when said number of data subsets is greater than zero;

decreasing said number of data subsets by one; and repeating said counting, allocating and decreasing steps until an optimum allocation of data subsets is achieved when said number of data subsets equals zero.

15. A computer program recorded on a computer-readable medium, said computer program designed to operate a computer to provide an approximate answer to an aggregate query in a relational database, by executing the steps of:

receiving a query;

precomputing a summary of a data cube corresponding to a stored relational database by defining at least one sub-cube;

summarizing said at least one of sub-cube using a plurality of histogram techniques;

computing an error/space benefit for each summary of said at least one sub-cube corresponding to each histogram technique;

calculating a maximum of the error/space benefits, wherein said maximum of said error/space benefit corresponds to a summary with a minimum error; and providing an approximate answer to said query using the histogram technique corresponding to said maximum error/space benefit.

16. The computer program recorded on a computer-readable medium as in claim 15, wherein said query is an aggregate query.

17. The computer program recorded on a computer-readable medium as in claim 15, wherein said approximate answer is calculated by further executing the steps of:

counting a number of data subsets corresponding to the histogram technique corresponding to said maximum error/space benefit;

allocating a new data subset to said histogram technique corresponding to said maximum error/space benefit when said number of data subsets is greater than zero;

decreasing said number of data subsets by one; and repeating said counting, allocating and decreasing steps until an optimum allocation of data subsets is achieved when said number of data subsets equals zero.

18. A system comprising a programmed computer and a stored relational database, wherein said computer is programmed to maximize a benefit for a data sub-cube in said stored relational database, by executing the steps of:

allocating a predetermined number of data subsets to a histogram on said subcube having a first data configuration;

generating a second data configuration on said sub-cube using said predetermined number of data subsets;

calculating an error value for each data configuration;

subtracting said error values; and updating said first data configuration based on said subtracted error values, wherein said benefit is a minimum error.

19. The system comprising a programmed computer and a stored relational database as in claim 18, wherein said computing step further comprises:

allocating a predetermined number of data subsets to a histogram on said at least one sub-cube having a first data configuration;

generating a second data configuration on said at least one sub-cube using said predetermined number of data subsets;

calculating an error value for each data configuration;

subtracting said error values; and updating said first data configuration based on said subtracted error values.

20. The system comprising a programmed computer and a stored relational database as in claim 18, wherein said histogram technique a direct technique.

21. The system comprising a programmed computer and a stored relational database as in claim 18, wherein said histogram technique a slicing technique.

22. The system comprising a programmed computer and a stored relational database as in claim 18, wherein said histogram technique a merging technique.

23. The computer program recorded on a computer-readable medium as in claim 18 wherein said approximate answer is calculated by further executing the steps of:

counting a number of data subsets corresponding to the histogram technique corresponding to said maximum error/space benefit;

allocating a new data subset to said histogram technique corresponding to said maximum error/space benefit when said number of data subsets is greater than zero;

decreasing said number of data subsets by one; and repeating said counting, allocating and decreasing steps until an optimum allocation of data subsets is achieved when said number of data subsets equals zero.

24. A computer system for providing an approximate answer to a query in a stored relational database, the system comprising:

means for receiving said query containing input data to said stored relational database;

means for precomputing a summary of a data cube corresponding to said stored relational database by defining at least one sub-cube;

means for summarizing said at least one sub-cube using a plurality of histogram techniques;

means for computing an error/space benefit for each summary of said at least one sub-cube corresponding to each histogram technique;

means for determining a maximum of the error/space benefits, wherein said maximum error/space benefit corresponds to a summary with a minimum error;

means for calculating an approximate answer to said query based on said input data using the histogram technique corresponding to said maximum error/space benefit; and means for outputting said approximate answer.

25. The computer system for providing an approximate answer to a query as in claim 24, wherein said query is an aggregate query.

26. The computer system for providing an approximate answer to a query as in claim 25, wherein said computing step further comprises:

means for allocating a predetermined number of data subsets to a histogram on said at least one sub-cube having a first data configuration;

means for generating a second data configuration on said at least one sub-cube using said predetermined number of data subsets;

means for calculating an error value for each data configuration;

means for subtracting said error values; and means for updating said first data configuration based on said subtracted error values.

27. The computer system for providing an approximate answer to a query as in claim 25, wherein said histogram technique is a direct technique.

28. The computer system for providing an approximate answer to a query as in claim 25, wherein said histogram technique is a slicing technique.

29. The computer system for providing an approximate answer to a query as in claim 25, wherein said histogram technique is a merging technique.

30. A computer implemented method for data subset allocation within a histogram comprising the steps of:

counting a number of data subsets corresponding to a histogram which has a maximum error/space benefit, wherein said maximum of said error/space benefit corresponds to a histogram with a minimum error;

allocating a new data subset to said histogram corresponding to said maximum error/space benefit when said number of data subsets is greater than zero;

decreasing said number of data subsets by one;

repeating said counting, allocating and decreasing steps until said number of data subsets equals zero; and using said allocation of data subsets to achieve an optimum allocation of data subsets in said histogram.

* * * * *